Dec. 17, 1940.  H. C. DANIELS  2,225,334
HIGH-TENSION ELECTRICAL-TRANSMISSION CABLES
Filed May 2, 1940  2 Sheets-Sheet 2
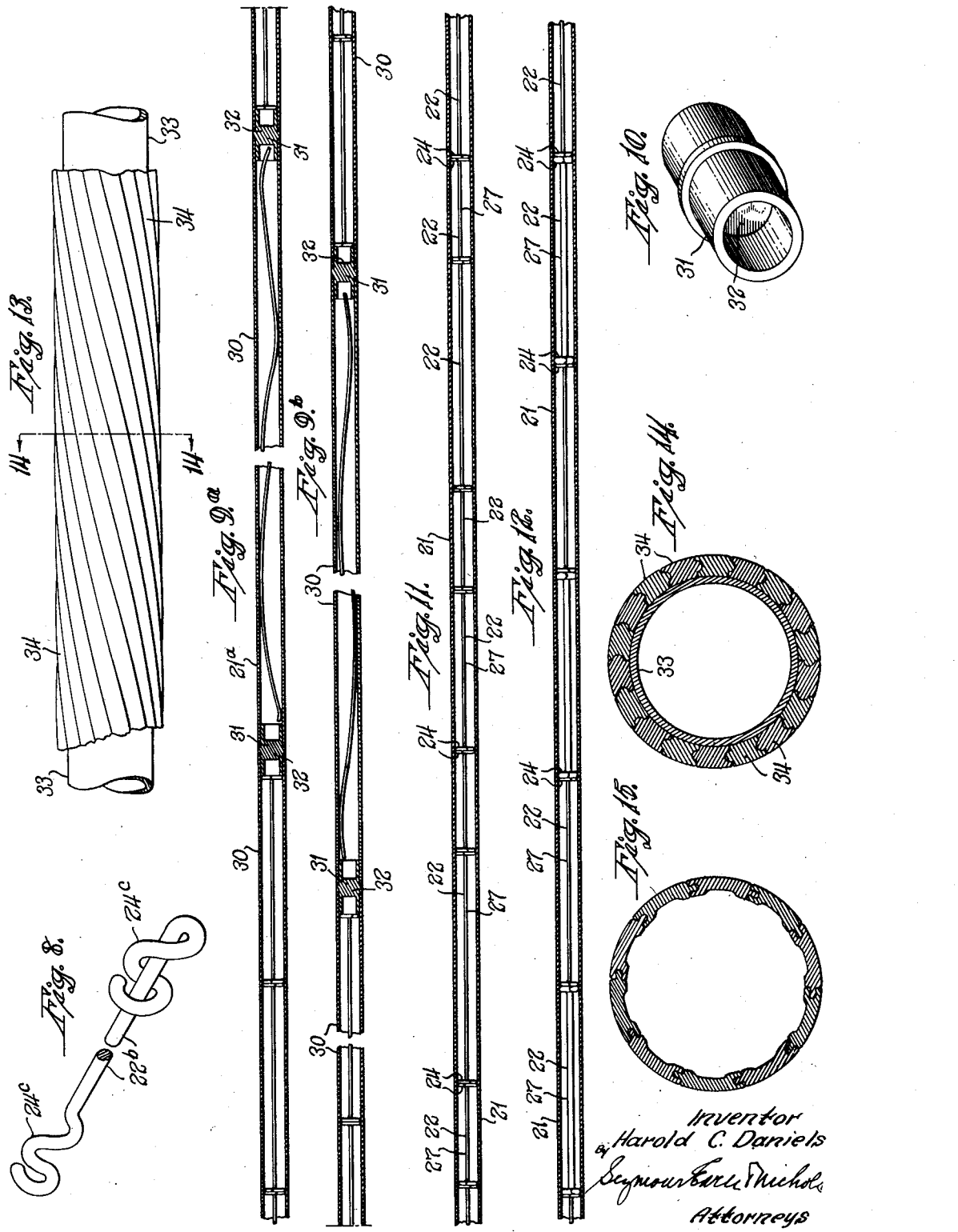

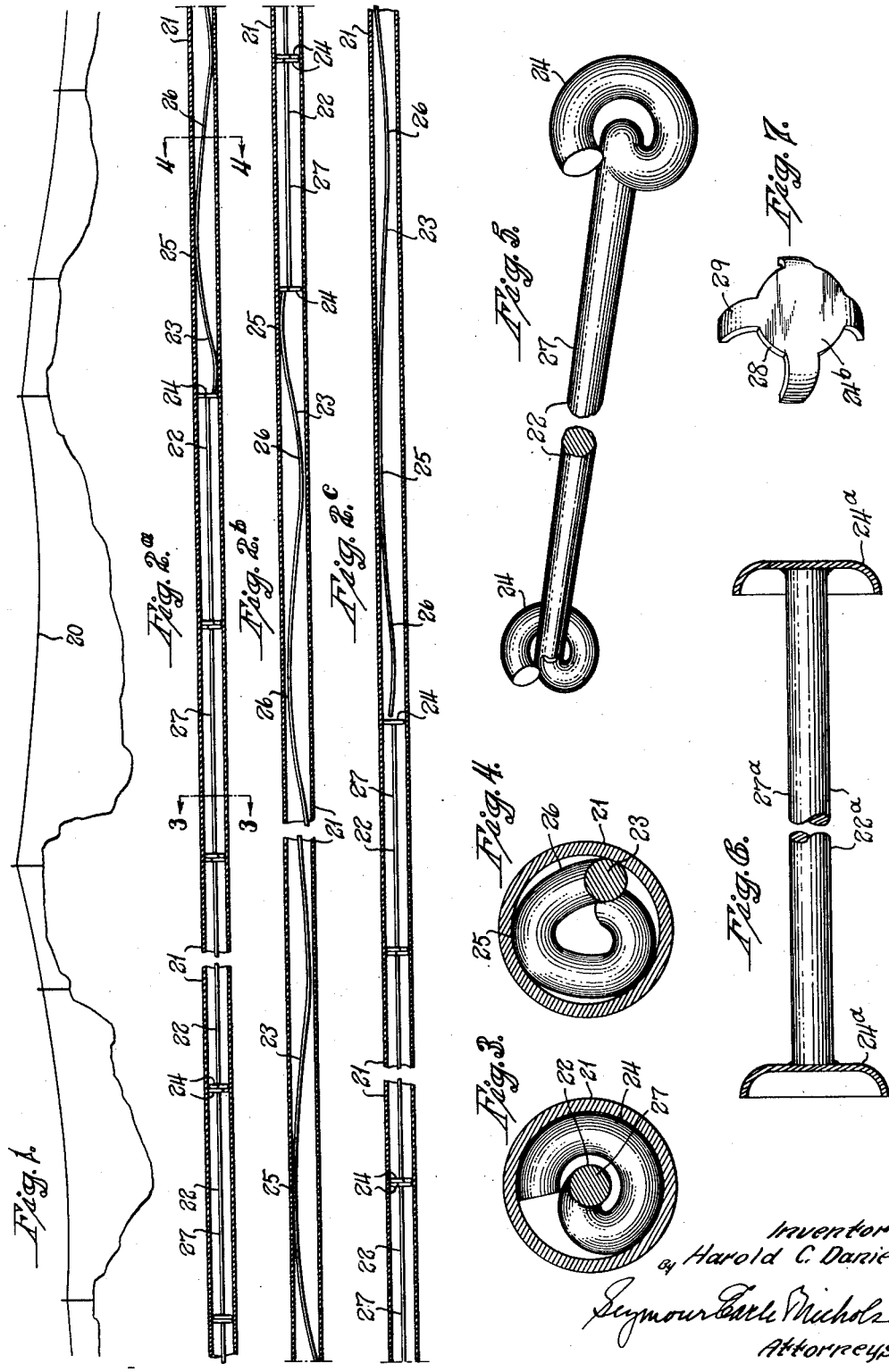

Patented Dec. 17, 1940

2,225,334

UNITED STATES PATENT OFFICE 2,225,334

HIGH-TENSION ELECTRICAL-TRANSMISSION CABLE

Harold C. Daniels, Woodbury, Conn., assignor to Chase Brass & Copper Co. Incorporated, Waterbury, Conn., a corporation Application May 2, 1940, Serial No. 332,944

6 Claims. (Cl. 174—42)

The present invention relates to improvements in high-tension electrical-transmission cables, and more particularly to hollow overhead-suspension high-tension electrical-transmission cables.

As is well known, and as appears from Patent No. 2,028,930 granted on January 28, 1936, to John J. Taylor, hollow overhead-suspension high-tension electrical-transmission cables have been subject to serious vibration tendencies with consequent fatigue and breaking of the cable and of the supports adjacent the points of support.

Heretofore, it has been attempted by various means, to decrease or eliminate these harmful vibrations of the cable by means of a single type of vibration-damping means placed within the cable. While the aforementioned Taylor patent discloses various types of internal vibration dampers, it only teaches the use of one type of damper in a cable under any given situation. I have found, however, that owing to the wide range of the rates of vibration to which cables are subject due to various air currents, that it is impossible to obtain a maximum vibration-damping effect from any single type of vibration damper, but that a highly satisfactory vibration-damping effect can be obtained by employing different vibration dampers having at least two different natural periods of vibration in a given span of cable.

One object of this invention, therefore, is to provide an improved hollow overhead-suspension high-tension electrical-transmission cable with improved vibration-damping means therein.

Another object of this invention is to provide a hollow overhead-suspension high-tension electrical-transmission cable with improved vibration-damping means formed of simple elements readily manufactured and readily assembled to produce an efficient durable construction at low cost.

With the above and other objects in view, as will appear to those skilled in the art from the present disclosure, this invention includes all features in the said disclosure which are novel over the prior art.

In the description and claims, the various parts and steps are identified by specific names for convenience, but they are intended to be as generic in their application as the prior art will permit.

In the accompanying drawings forming part of the present disclosure, in which certain ways of carrying out the invention are shown for illustrative purposes:

Fig. 1 is a schematic side elevation illustrating an overhead-suspension high-tension electrical-transmission cable or line embodying the present invention as shown in connection with cable supports and the adjacent earth contours;

Figs. 2a, 2b and 2c are respectively successive portions in longitudinal section, of a hollow high-tension electrical-transmission cable illustrating one vibration-damper embodiment of the present invention;

Fig. 3 is a cross-sectional view on line 3—3 of Fig. 2a;

Fig. 4 is a cross-sectional view on line 4—4 of Fig. 2a;

Fig. 5 is a perspective view of one of the short vibration-dampers shown at the left of Fig. 2a;

Fig. 6 is a side elevation partly in section of a vibration-damper similar to that shown in Fig. 5, but with a modified form of end-supports;

Fig. 7 is a perspective view of a modified form of end-support somewhat similar to the end-supports shown in Fig. 6;

Fig. 8 is a perspective view of a vibration-damper which is similar to the vibration-damper shown in Fig. 5 except that the end-supports are somewhat different;

Figs. 9a and 9b are successive portions in longitudinal section of a cable formed of a series of body-tubes joined together in end-to-end relationship, and with vibration-dampers similar to those illustrated in Figs. 2a, 2b and 2c, therein;

Fig. 10 is a perspective view of one of the body-tube connectors which connect the body-tubes shown in Figs. 9a and 9b;

Fig. 11 is a longitudinal section of a hollow cable illustrating a modified form of vibration-damper in which the vibration-dampers are similar to that shown in Fig. 5, but various of the vibration-dampers of different lengths, in order to provide dampers having different natural periods of vibration;

Fig. 12 is a longitudinal section similar to Fig. 11 of a hollow cable with still another modified construction of vibration-dampers, in which the vibration-dampers are similar to those illustrated in Figs. 5 and 11, but various of the vibration-dampers are formed of various weights or thicknesses of wires or rods, in order to provide dampers having different natural periods of vibration;

Fig. 13 is a fragmental side elevation of a hollow high-tension electrical-transmission cable in which the tube illustrated in the preceding figures is shown as surrounded by a plurality of metal strands;

Fig. 14 is a transverse sectional view on line 14—14 of Fig. 13; and

Fig. 15 is a view similar to Fig. 14 of a different form of hollow conductor.

In carrying out the invention in the way illustrated in Figs. 1 to 5 inclusive of the drawings, the overhead-suspension high-tension electrical-transmission line 20 may employ any suitable tubular construction such, for example, as the tube 21. Inasmuch as I have found that most effective vibration-damping effects are accomplished by having vibration-dampers inside the tube 21 which have different natural periods of vibration, I have illustrated in Figs. 2a to 4 inclusive, first a series of vibration-dampers 22 which are relatively-short and arranged in end-to-end relation as a first group, then a second form of relatively-long vibration-damper 23 which consists of a single wire of considerable length, then another group of the relatively-short vibration-dampers 22 again followed by a relatively-long vibration-damper 23, and so on.

The vibration-dampers 22 are preferably formed of spring steel wire of such character that the end-supports 24 can be formed by bending them cold, and without the vibration-dampers 22 requiring any further heat treatment. Each vibration-damper 23 can be formed of a soft iron or steel wire. The vibration-dampers 23 can be formed of various lengths and of various sizes of wire. I have found that the vibration-dampers 22 can be made of a length of about thirty inches for use in a tube 21 having an internal diameter of about 5/8 of an inch, the end-supports 24 of the vibration-dampers 22 preferably being a good fit in the tubes so as to be held snugly and prevent rattling. Where the vibration-dampers 22 are made of a length of thirty inches, I have found that No. 7 wire gives satisfactory results.

The long vibration-dampers 23 may be of any of various desired lengths such, for example, as from perhaps as short as about twenty feet to longer than one hundred feet. I have found that for any of these lengths when used in a tube of the size heretofore mentioned, that a No. 7 wire gives satisfactory results. Each long vibration-damper 23 merely consists of a soft steel or iron wire unwound from a usual commercial coil of such wire which frequently is about thirty inches in diameter, and shoving the wire into the tube. In actual practice the wire forms itself in up-and-down undulations, and twists about into various positions in the tube, as illustrated in Figs. 2a, 2b, 2c and 4, with spaced-apart support-portions 25 and an intermediate vibratable-portion 26 between each two support-portions.

The short vibration-dampers 22 are so constructed that the intermediate wire vibratable-portion 27 extends along the center or adjacent the central axis of the tube 21.

As has been hereinbefore stated, I have discovered that owing to the considerable range of periods of vibration of conductors due to various conditions and circumstances, including the variation of length of span between supports, speed of the wind, and other factors, that the most satisfactory damping effect can not be accomplished by vibration-dampers having only one natural period of vibration, but that by employing vibration-dampers having at least two different periods of vibration such as illustrated and described concerning Figs. 1 to 5 inclusive, that an exceedingly effective damping or decreasing of the vibrations of the cable is effected.

For use in the form of the invention illustrated in Figs. 2a, 2b and 2c, the total length of the tube occupied by the short vibration-dampers 22 can be about one-third, with two-thirds of the length of the tube occupied by one or more of the long vibration-dampers 23, although the short vibration-dampers 22 can occupy as much as fifty per cent or more of the tube length with the balance occupied by the long vibration-dampers 23.

The vibration-dampers are so selected that at any dangerous frequency at which the cable may tend to vibrate from wind impulses, there will be sufficient vibration-dampers sympathetically sensitive to that frequency to vibrate at a similar but out-of-phase or contrary-phase relation so as to neutralize the activating forces at their inception, by out-of-phase reflection. Another way of explaining the damping action is that when the wind starts the cable to vibrating, the action of the cable in vibrating starts the vibratable-portions of the vibration-dampers vibrating, but owing to the fact that these vibratable-portions of the vibration-dampers have a different natural period of vibration from that of the cable-section in which they are located, they vibrate out of phase with the cable-section, thus tending to balk and neutralize the vibration of the cable-section. And inasmuch as different sections of the cable may be subject to different vibration periods depending upon different lengths of span and conditions of installation and other factors, there is no single vibration-damper that will give maximum results over the whole range of vibration periods which occur in practice, whereas employing vibration-dampers having at least two different periods of vibration, I have found to be very effective in greatly reducing or substantially eliminating the harmful vibration of the cable.

Referring to Fig. 6 which illustrates a modified form of short vibration-damper 22a, similar to the vibration-dampers 22, in which the intermediate wire or vibratable-portion 27a is spot welded to end-supports 24a in the form of cupped disks which are intended to closely fit within the tube in which they are employed. Fig. 7 illustrates a modified form of end-support 24b similar to the end-support 24a except that it has cut-out portions 28 which leave spaced-apart supporting-feet 29. The direction of curvature or cupping of the outer rim of the end-supports 24a shown in Fig. 6, and of the supporting-feet 29 shown in Fig. 7, is for the purpose of facilitating sliding the vibration-dampers into the end of a tube.

The vibration-damper 22b illustrated in Fig. 8, is essentially the same as the vibration-damper 22 illustrated in Fig. 5, except that instead of the end-supports 24c being formed by coiling in a single plane as in the case of the end-supports 24 in Fig. 5, they are coiled in an enlarging and receding spiral in the same direction in order to facilitate easy entrance of the vibration-damper 22b into the tube in which it is to be placed in a similar way to the easy entrance of the end-supports 24a and 24b described concerning Figs. 6 and 7.

Figs. 9a and 9b illustrate successive portions of a cable or cable-tube 21a formed of body-tubes 30 arranged in end-to-end relationship and joined together by means of body-tube connectors 31 by sweat soldering or other suitable means as more fully set forth in my application, Serial No. 274,341, filed May 18, 1939. Each of the body-tube connectors 31 has an interior partition 32. The body-tubes 30 are preferably formed with a circumferentially-continuous wall so as to remain watertight even when subjected to bending, and are preferably formed seamless, although they could be formed of a strip curved to tubular shape and welded or brazed at the adjacent edges or equivalent, to give a watertight and strong wall construction. While copper is preferably employed in making the body-tubes and the body-tube connectors, any suitable metal having suitably high electrical conductivity for the particular installation required, may be used. In the form of the invention illustrated in Figs. 9a and 9b, each alternate body-tube 30 is filled with relatively-short vibration-dampers 22 or the like, and each other alternate body-tube 30 is filled with one or more relatively-long vibration-dampers 23 or the like. Inasmuch as the shortest overhead span of cable will ordinarily not be much under about three hundred feet, each of the body-tubes 30 can have a length up to a hundred feet or more and still result in any given span of an installation having vibration-dampers therein of different natural periods of vibration. If desired, each alternate body-tube 30 could be of one length, and each other alternate body-tube 30 could be of another length, to still further facilitate securing different natural periods of vibration of a given span of conductor.

In the form of the invention illustrated in Fig. 11, the cable-tube 21 is illustrated as filled with short vibration-dampers 22 in which the vibratable-portions of certain of the vibration-dampers have different natural periods of vibration from that of certain others of the vibration-dampers, due to their being of different lengths.

In the form of the invention illustrated in Fig. 12, although the vibration-dampers are illustrated as being all of the same length, they are made of different diameters of wire or rod, thus certain of them are made of diameters of wire differing from the diameters used in making certain of the others, thereby bringing about different natural periods of vibration in the vibratable-portions of these vibration-dampers. It will be evident that different vibration periods could be obtained by employing any other combination of vibration-dampers in which the natural period of vibration of certain of the vibratable-portions is different from that of other vibratable-portions. Instead of using merely a tube 21 or the like for the cable, the cable could be formed as in Figs. 13 and 14 with an interior tube 33 surrounded by generally-longitudinally-extending spiral strands 34. While the strands 34 could be of circular cross section, they would preferably have a cross section somewhat of the type illustrated in cross section in Fig. 14 in order to reduce the objectionable corona losses.

Fig. 15 illustrates still another form of tubular cable of well-known form that could be employed in place of either of those hereinbefore referred to.

When seamless copper tubing is used for conductors made in accordance with the present invention, it will preferably be what is known as quarter hard tubing to permit of readily bending it into coils for shipping. Where copper strands are used as shown in Figs. 13, 14 and 15, they will preferably be hard drawn for strength.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A hollow overhead-suspension high-tension electrical-transmission cable, including in combination: a tubular conductor; and vibration-dampers inside of different longitudinal portions of said tubular conductor, each of the said vibration-dampers having one or more vibratable-portions adapted to vibrate transversely relatively to portions of said tubular conductor located radially of said vibratable-portions, and to damp the vibration of said tubular conductor, the natural period of vibration of certain of said vibratable-portions being substantially different from that of others of said vibratable-portions.

2. A hollow overhead-suspension high-tension electrical-transmission cable, including in combination: a tubular conductor; and vibration-dampers inside of different longitudinal portions of said tubular conductor, each of the said vibration-dampers having one or more vibratable-portions consisting substantially only of wire-like means adapted to vibrate transversely relatively to portions of said tubular conductor located radially of said vibratable-portions, and to damp the vibration of said tubular conductor, the natural period of vibration of certain of said vibratable-portions being substantially different from that of others of said vibratable-portions.

3. A hollow overhead-suspension high-tension electrical-transmission cable, including in combination: a tubular conductor; and vibration-dampers inside of different longitudinal portions of said tubular conductor, each of the said vibration-dampers having one or more vibratable-portions adapted to vibrate transversely relatively to portions of said tubular conductor located radially of said vibratable-portions, and to damp the vibration of said tubular conductor, the natural period of vibration of certain of said vibratable-portions being substantially different from that of others of said vibratable-portions, each of certain of said vibration-dampers being relatively-short and having two spaced-apart end-supports and an intermediate longitudinal wire-like means forming a vibratable-portion and extending along the center of the tubular conductor and others of said vibration-dampers each being relatively-long and having a non-straight wire-like means having spaced-apart support-portions contacting the interior of the tubular conductor, the wire-like portion between each two of said support-portions forming a vibratable-portion.

4. A hollow overhead-suspension high-tension electrical-transmission cable, including in combination: a tubular conductor; and vibration-dampers inside of different longitudinal portions of said tubular conductor, each of the said vibration-dampers having one or more vibratable-portions adapted to vibrate transversely relatively to portions of said tubular conductor located radially of said vibratable-portions, and to damp the vibration of said tubular conductor, the natural period of vibration of certain said vibratable-portions being substantially different from that of others of said vibratable-portions, certain of said vibration-dampers being relatively-short and arranged in spaced-apart groups, the vibration-dampers of each group being arranged in end-to-end relation and each vibration-damper having two spaced-apart end-supports and an intermediate longitudinal wire-like means forming a vibratable-portion and extending along the center of the tubular conductor, and a relatively-long vibration-damper arranged between each two of said spaced-apart groups of vibration-dampers and having a non-straight wire-like means having spaced-apart support-portions contacting the interior of the tubular conductor, the wire-like portion between each two of said support-portions forming a vibratable-portion.

5. A hollow overhead-transmission high-tension electrical-transmission cable, including in combination: a tubular conductor having a series of metal body-tubes joined together in end-to-end relationship; and vibration-dampers inside of said body-tubes, each of the said vibration-dampers having one or more vibratable-portions adapted to vibrate transversely relatively to portions of the tubular conductor located radially of said vibratable-portions, and to damp the vibration of said tubular conductor, the natural period of vibration of certain of said vibratable-portions being substantially different from that of others of said vibratable-portions.

6. A hollow overhead-transmission high-tension electrical-transmission cable, including in combination: a tubular conductor having a series of metal body-tubes joined together in end-to-end relationship; and vibration-dampers inside of said body-tubes, each of the said vibration-dampers having one or more vibratable-portions adapted to vibrate transversely relatively to portions of the tubular conductor located radially of said vibratable-portions, and to damp the vibration of said tubular conductor, the natural period of vibration of certain of said vibratable-portions being substantially different from that of others of said vibratable-portions, each of alternate body-tubes containing a plurality of relatively-short vibration-dampers arranged in end-to-end relation and each said short vibration-damper having two spaced-apart end-supports and an intermediate longitudinal wire-like means forming a vibratable-portion and extending along the center of the tubular conductor, and each body-tube intermediate two of said alternate body-tubes containing one or more relatively-long vibration-dampers having a non-straight wire-like means having spaced-apart support-portions contacting the interior of the body-tube, the wire-like portion between each two of said spaced-apart support-portions forming a vibratable-portion.

HAROLD C. DANIELS.